(12) United States Patent
Koors et al.

(10) Patent No.: US 7,752,925 B2
(45) Date of Patent: Jul. 13, 2010

(54) SEAT BELT ASSEMBLY INCLUDING RESISTIVE FILM FOR DETERMINING TENSION

(75) Inventors: Mark A. Koors, Kokomo, IN (US); James F. Patterson, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 96 days.

(21) Appl. No.: 12/284,741

(22) Filed: Sep. 25, 2008

(65) Prior Publication Data
US 2010/0071483 A1    Mar. 25, 2010

(51) Int. Cl.
*G01L 1/26* (2006.01)

(52) U.S. Cl. ............... 73/862.391; 73/862.381

(58) Field of Classification Search .......... 73/760, 73/862.381–862.391
See application file for complete search history.

(56) References Cited

U.S. PATENT DOCUMENTS

| | | | |
|---|---|---|---|
| 4,169,614 A * | 10/1979 | Ellens ................. | 280/801.1 |
| 5,806,148 A * | 9/1998 | McFalls et al. ............ | 24/168 |
| 6,328,013 B1 * | 12/2001 | Calhoun ................ | 123/198 D |
| 6,641,074 B2 * | 11/2003 | Shih et al. .............. | 242/374 |
| 6,952,974 B2 | 10/2005 | Lin | |
| 6,981,425 B2 * | 1/2006 | Frederick .............. | 73/862.391 |
| 7,252,307 B2 | 8/2007 | Kanbe et al. | |
| 2002/0062688 A1 | 5/2002 | Lawson | |
| 2002/0189365 A1 | 12/2002 | Blakesley et al. | |

* cited by examiner

*Primary Examiner*—Max Noori
(74) *Attorney, Agent, or Firm*—Paul W. Thiede; Thomas N. Twomey

(57) ABSTRACT

A seat belt assembly includes a webbing, a resistive film attached to the webbing, and a connector. The connector further includes a first contact connected to first contact point on the resistive film and a second contact connected to a second contact point on the resistive film. The electrical resistance of the film between the first contact point and the second contact point is proportional to tension applied axially to the webbing. The first contact and the second contact are electrically connected to an electrical resistance measuring device.

20 Claims, 5 Drawing Sheets

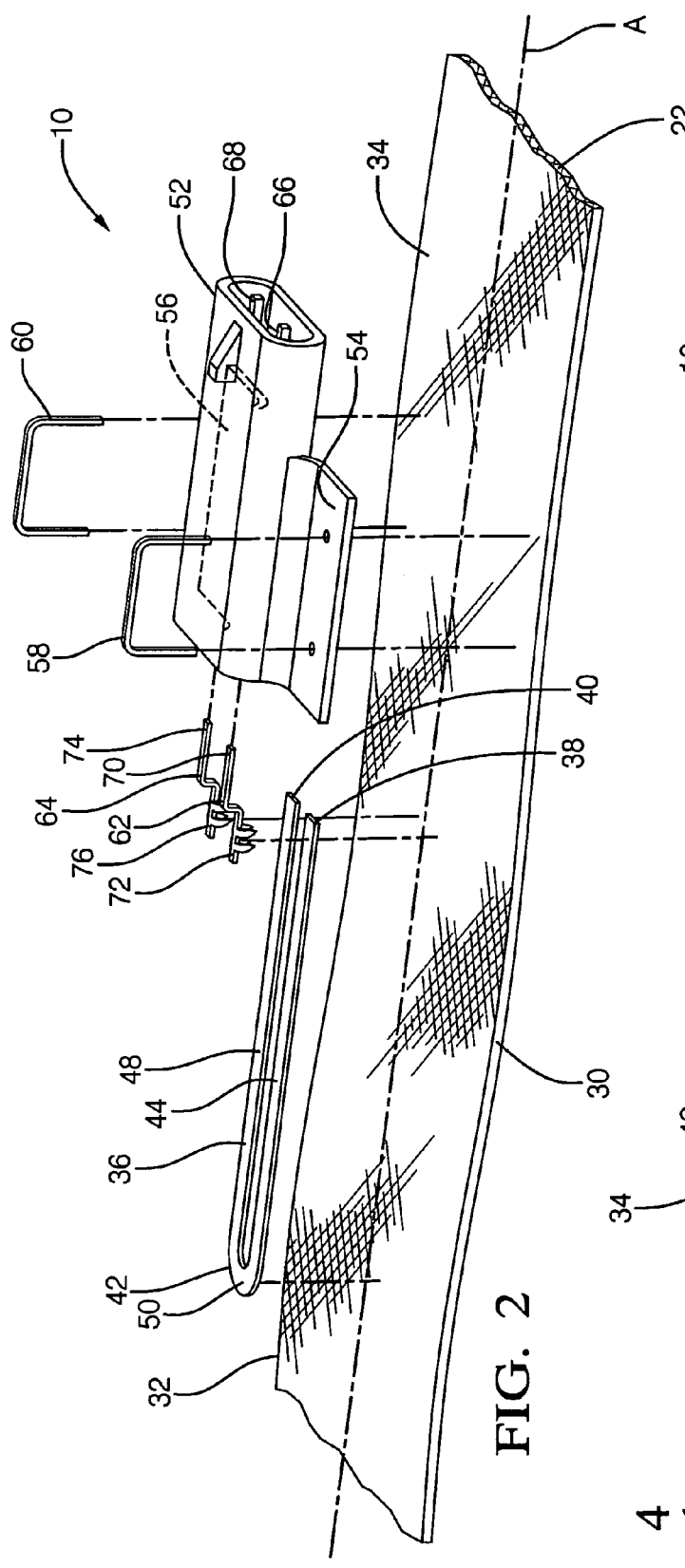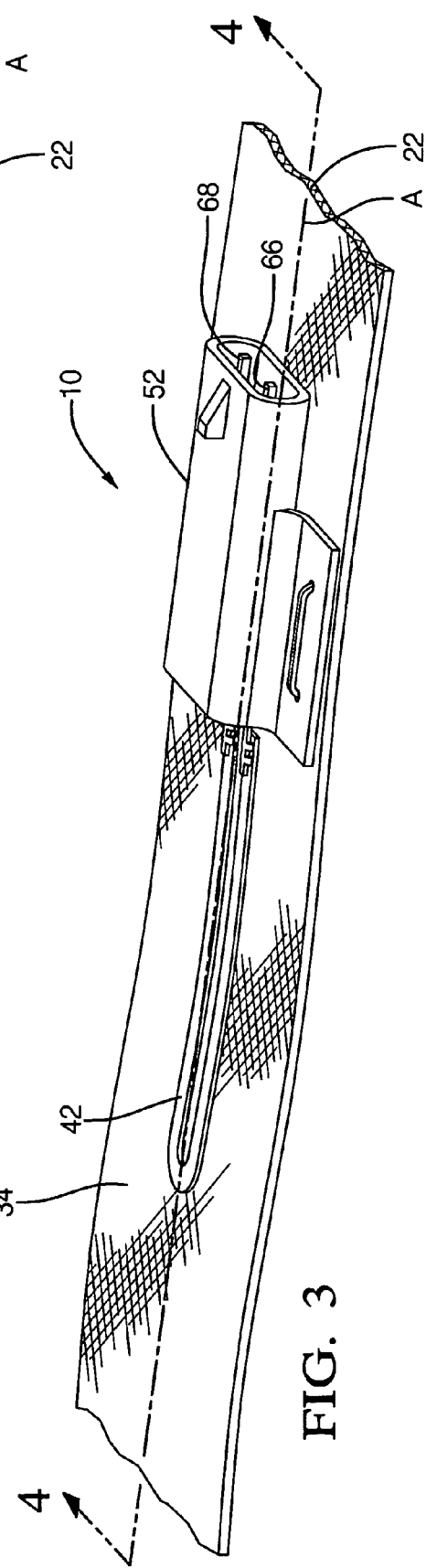
FIG. 2
FIG. 3

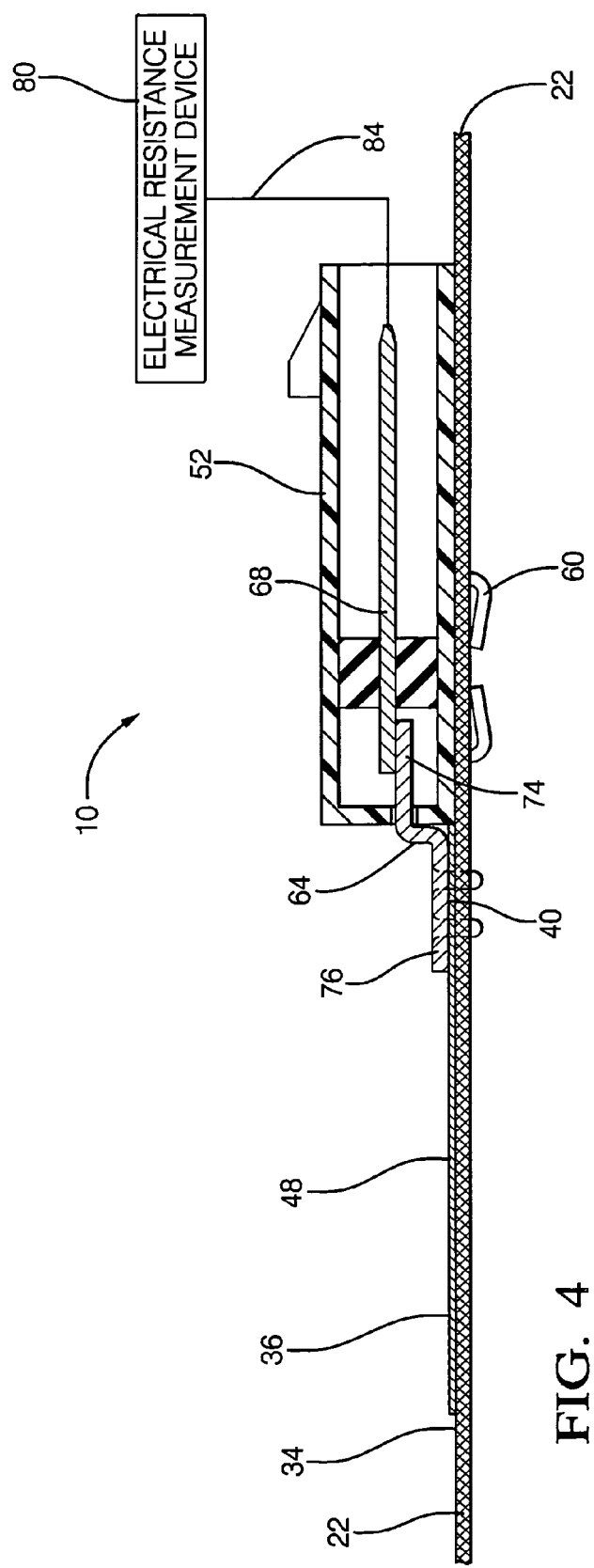

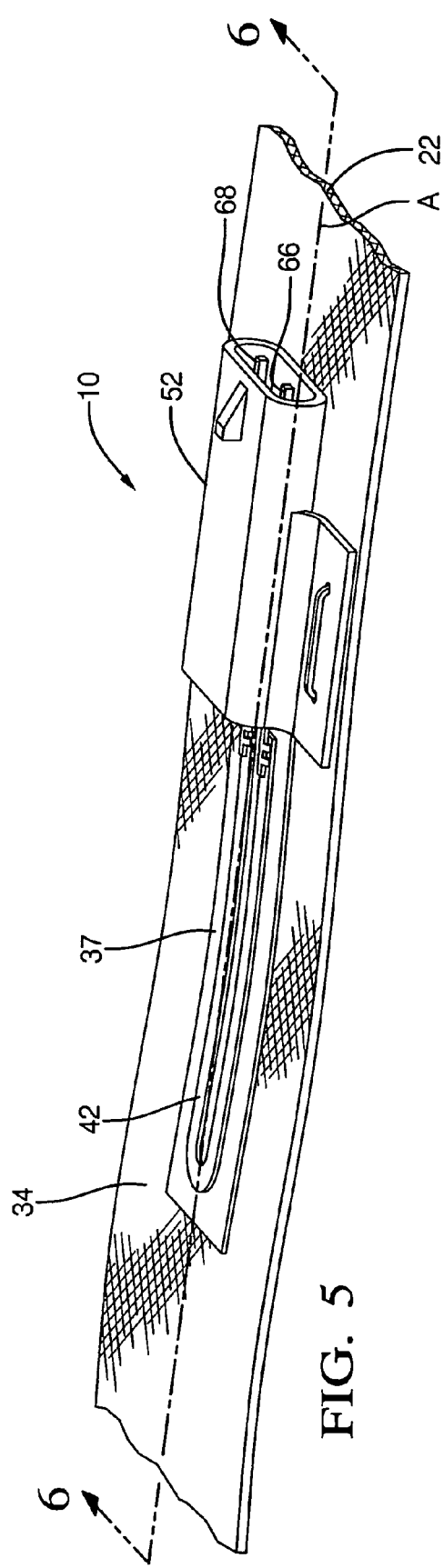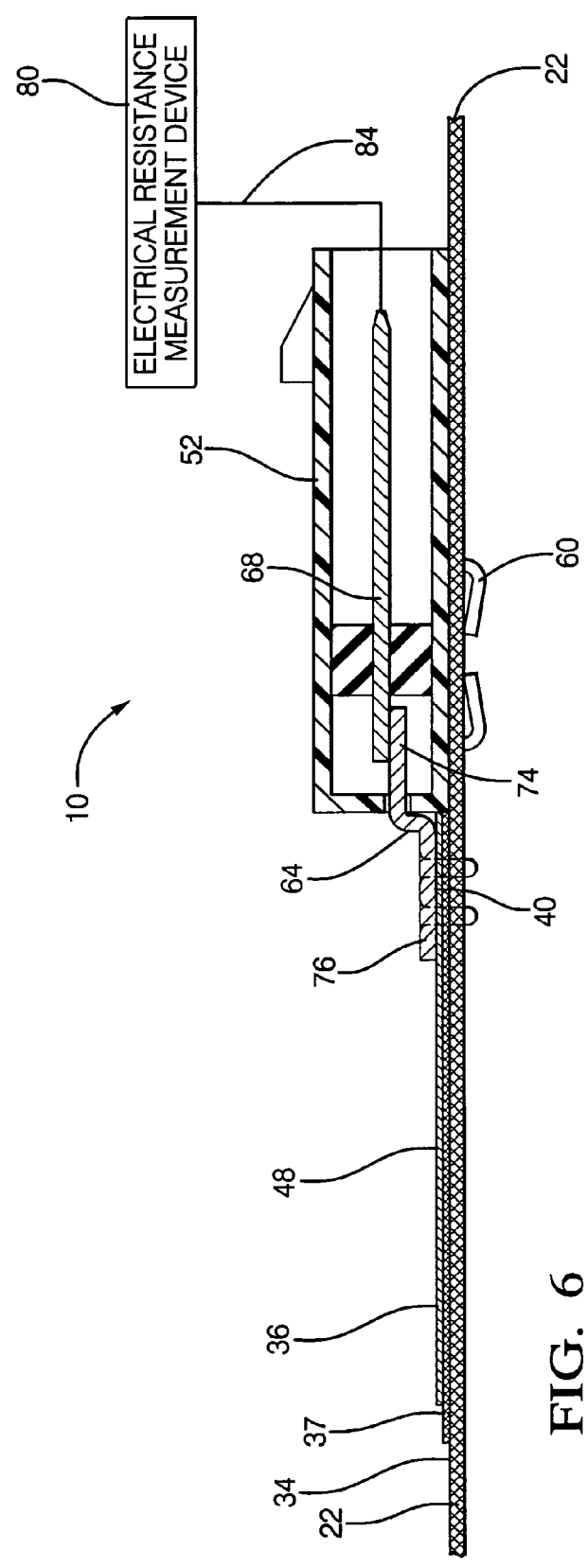

SEAT BELT ASSEMBLY INCLUDING RESISTIVE FILM FOR DETERMINING TENSION

TECHNICAL FIELD

This invention relates to a seat belt assembly that includes an electrical resistive film attached to the webbing. More particularly, this invention relates to such a seat belt assembly that includes a connector for measuring the electrical resistance of the film, wherein the measured resistance is proportional to the tension applied to the webbing.

BACKGROUND OF INVENTION

In an automotive vehicle, it is known that a seat belt harness includes webbing and a buckle that latches the webbing across an occupant to restrain and protect an occupant from injury during a collision event. The seat belt harness is often additionally used as part of an occupant detection system that further protects vehicle occupants in the event of a vehicle crash. One type of passenger occupant detection system includes a belt tension sensor (BTS). Current belt tension sensors are constructed as part of a seat belt harness assembly to measure cinch tension applied axially along the webbing of the seat belt harness, yet still allow the restraint function to be performed. The belt tension sensor data is especially important to categorize a tightly cinched child seat belted into the front passenger seat. The pressure sensor and belt tension sensor components of the passenger occupant detection system electrically connect with a controller. The cinch tension data from the belt tension sensor and the pressure sensor data produced by the pressure sensor are input to the controller. The controller analyzes the cinch tension data in an algorithm that compensates the pressure sensor data for the additional load produced by the cinched seat belt harness represented by the cinch tension data. The compensated pressure sensor data is a more precise reading of the actual weight in the passenger seat that is used by the passenger occupant detection system to determine a deployment decision to deploy or not deploy a passenger vehicle air bag. The passenger occupant detection system communicates the deployment decision output to the vehicle's air bag controller or sensing diagnostic module (SDM) that implements the passenger occupant detection system's air bag deployment decision if a vehicle collision event occurs.

One current belt tension sensor device comprises a housing that further contains springs, magnets, and a Hall Effect sensor that increases device cost. A second current belt tension sensor design includes a hub, disc portion, and rim components that also increase device cost. Further, current belt tension sensor devices have a disadvantage of being large and connect between the seat belt harness and the frame of the vehicle adding bulk, complexity, and expense to the seat belt harness assembly.

Therefore, what is needed is a robust seat belt assembly for reliably sensing tension on the webbing, eliminates the need to perform the restraint function for the occupant on the seat belt harness, is attached on the webbing of the seat belt, has a lower material and serviceability cost, has a lower component weight, and is easily integrated into the webbing of the seat belt harness.

SUMMARY OF THE INVENTION

In accordance with this invention, a seat belt assembly is adapted for determining tension on a seat belt. The seat belt assembly includes a webbing, a film bonded to the surface of the webbing, and a connector proximate to the webbing. The webbing has webbing surface formed of an electrically non-conductive material that elongates in response to axial tension applied to the webbing. A film formed of electrically resistive material having an electrical resistance is attached to the webbing surface and has a first contact point and a second contact point. A connector proximate to the webbing includes a first contact that connects to the first contact point on the film and second contact that connects to the second contact point on the film, wherein the electrical resistance of the film between the first contact point on the film and the second contact point on the film is proportional to tension applied axially to the webbing.

BRIEF DESCRIPTION OF THE DRAWINGS

This invention will be further described with reference to the accompanying drawings in which:

FIG. 1A is a magnified view of the seat belt assembly of FIG. 1 showing the details thereof;

FIG. 2 is an exploded view of the seat belt assembly of FIG. 1A with a film attached to the webbing without a carrier;

FIG. 3 is an isometric view of the seat belt assembly in FIG. 2;

FIG. 4 is a cross section view of the seat belt assembly in FIG. 3 taken along line 4-4 in the direction of the arrows;

FIG. 5 is a isometric view of the seat belt assembly of FIG. 1A with a film attached to a carrier that is attached to the webbing;

FIG. 6 is a cross section view of the seat belt assembly in FIG. 5 taken along line 6-6 in the direction of the arrows;

DETAILED DESCRIPTION OF THE PREFERRED EMBODIMENT

Figure 1:
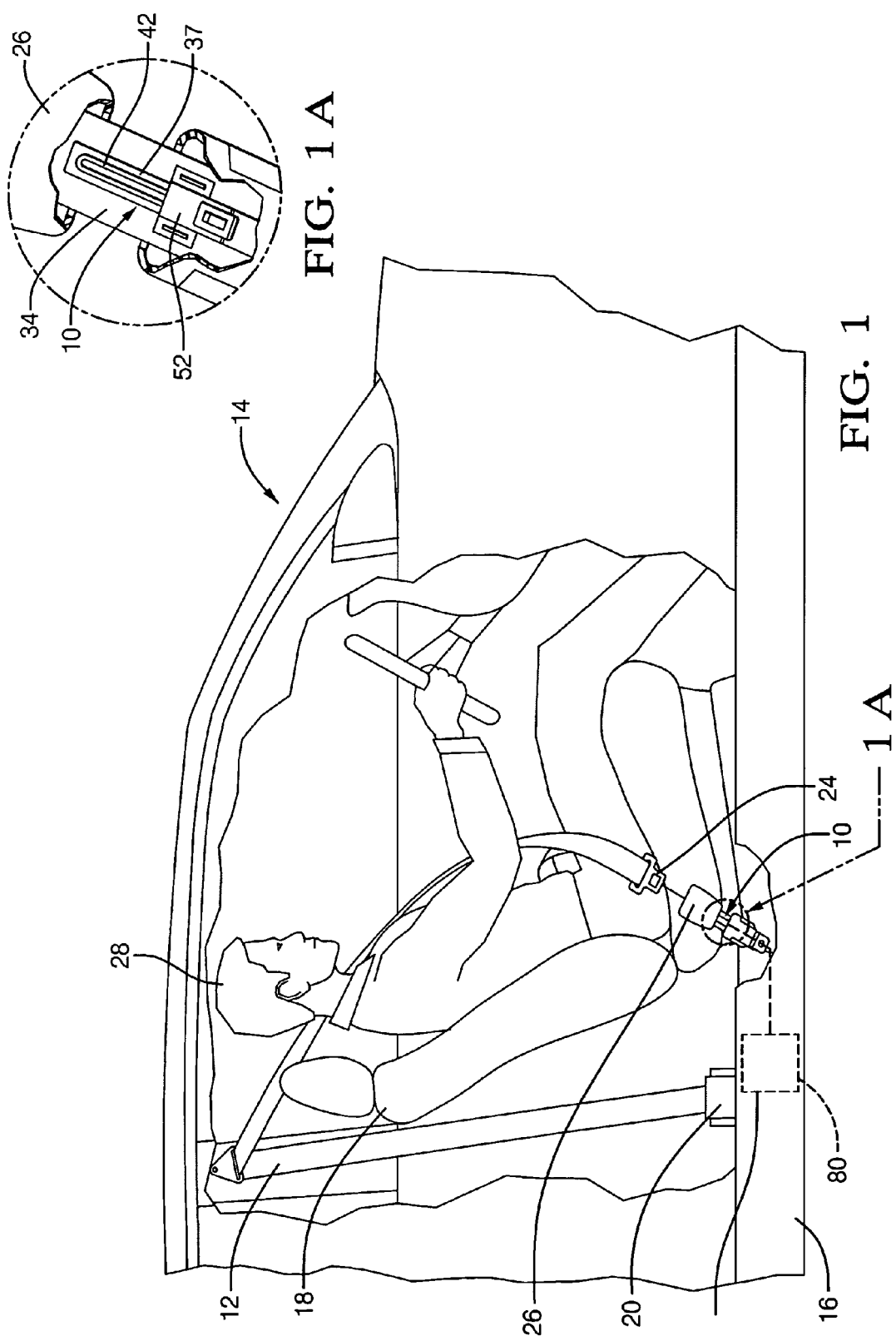
FIG. 1 is a cross section view of a vehicle showing a seat belt harness that includes a seat belt assembly located on the webbing below the buckle in accordance with this invention.

In accordance with a preferred embodiment of this invention, referring to FIG. 1, a seat belt assembly 10 for measuring tension applied to a seat belt harness 12 is employed in a vehicle 14. Harness 12 is attached to a frame 16 along the side of vehicle 14 in proximity to a seat 18. Harness 12 includes a coiling mechanism 20, a webbing 22, and a latch 24 connecting with webbing 22. A buckle 26 for latching latch 24 of harness 12 is secured to frame 16 and located on the side of seat 18 opposed and spaced apart from the side of vehicle 14 where coiling mechanism 20 is located. When not in use, harness 12 is in a storage position (not shown) at the side of vehicle 14 where coiling mechanism 20 is located in proximity to seat 18. When harness 12 is used by an adult occupant 28, latch 24 latches webbing 22 across the torso of occupant 28 into a buckle 26, drawing additional webbing 22 from coiling mechanism 20 to restrain and protect occupant 28 from injury during a collision event causing tension to be applied on webbing 22. Before occupant 28 exits vehicle 14, occupant 28 unlatches latch 24 from buckle 26 and harness 12 retracts from occupant 28 to the storage position (not shown) at the side of the vehicle 14 in proximity to seat 18 with excess webbing 22 collecting in coiling mechanism 20 and tension being released from webbing 22. As shown in FIG. 1A, for example, seat belt assembly 10 for measuring tension on webbing 22 is located on webbing 22 located below buckle 26.

Referring to FIGS. 2-3, seat belt assembly 10 includes webbing 22 having a longitudinal axis A with a first edge 30 and a second edge 32 parallel to axis A spaced apart by a webbing surface 34. Webbing 22 is formed of an electrically nonconductive material of woven monofilament or multifilament yarn. A preferred yarn material is synthetic high-strength polyester, nylon, or the like, which may sustain about 10% elongation at a loading of 1000 pounds.

As an axial tension is applied to webbing 22 parallel to first edge 30 and second edge 32, webbing 22 elongates in response to the applied axial tension. Axial tension is applied when occupant 28 sits in seat 18 and occupant 28 latches latch 24 of harness 12 into buckle 26 and tightens the belt for a snug fit across occupant 28. If the webbing is secured around a child car seat (not shown) placed in the seat and the harness is latched in the buckle, axial tension is applied to the webbing when the harness is cinched, or tightened firmly, against the car seat. Knowing the applied axial tension on the webbing of the harness provides confirmation for an occupant detection system that the child seat is present in the vehicle seat.

A film 36 has a shape and is attached to the webbing surface 34. The shape of film 36 varies in response to elongation of webbing 22 in response to applied axial tension to webbing 22. As shown in FIGS. 2-4, film 36 is bonded to webbing surface 34 by silk screen printing or a similar process. Alternately, film 36 can be attached to webbing surface 34 by being adhesively bonded.

In a further embodiment as shown in FIGS. 1A, and 5-6, film 36 is attached to carrier 37 by a silk-screen printing process or adhesively bonded to carrier 37. Carrier 37 is attached to webbing surface 34. For example, carrier 37 can be attached to webbing surface 34 by sewing carrier 37 to webbing 22. As tension is applied to webbing 22, tension is transferred to carrier 37 and film 36.

Film 36 is formed of an electrically resistive material having electrical resistance. The electrically resistive material of film 36 experiences resistance value change as webbing 22 is stretched with applied tension. Film 36 is characterized by a first contact point 38 and a second contact point 40. Film 36 comprises a U-shaped strip 42 having a first leg 44 and a second leg 48 spaced apart from first leg 44. A bridge section 50 connects first leg 44 and second leg 48. First leg 44 includes first contact point 38 spaced apart from bridge section 50. Second leg 48 includes second contact point 40 spaced apart from bridge section 50. First contact point 38 and second contact point 40 are spaced apart in a direction perpendicular to axis A. In the described embodiment in FIGS. 2-3, and 5, first leg 44 extends axially along webbing 22 and the second leg 48 extends axially along webbing 22 so first leg 44 and second leg 48 are parallel to first edge 30 and second edge 32.

Alternately, the U-shaped strip of film could be bonded to the webbing having a first leg and a second leg in a direction different from the axial direction along the webbing. For example, the U-shaped strip could be bonded to the webbing having legs that are perpendicular to axis A.

The resistive material of film 36 is preferably piezoresistive ink. Piezoresistive ink is bonded to the webbing by a silk-screen printing process that is an annealing process by applying heat. Other resistive material, such as resistive threads, could be used to provide the same general effect as piezoresistive ink. It is desirable to bond the film to a location on the webbing where it is protected from abnormal wear. The film can be further protected from damage by using a metal or plastic covering or shield that covers the seat belt assembly. If the seat belt assembly is placed at a location as shown in FIG. 1A, the webbing below the buckle often includes a plastic shroud as part of the seat belt harness. If the film is located on the webbing of the seat belt harness, a suitable location for the film is where the film cannot be wound up into the coil mechanism as describe herein with typical seat belt usage.

The preferred embodiment shows a single seat belt assembly 10, referring to FIG. 1A located on the webbing surface at a location below the buckle. Alternately, if additional electrical gain is needed for increased system performance, more than one film pattern can be attached to the webbing and be electrically connected together.

A connector 52 is proximate to webbing 22 and in the preferred embodiment is attached or firmly secured to webbing 22. As shown in FIGS. 2-3, and 5, a first flange 54 and a second flange 56 are integral to the sides of connector 52. A first fastener 58 is used to secure first flange 54 to webbing 22 outboard of first leg 44. A second fastener 60, similar to first fastener 58, is used to secure second flange 56 to webbing 22 outboard of second leg 48. In the example shown in FIGS. 2-5, the fastener is a single staple securing the flanges (54, 56) of connector 52 to webbing 22.

Referring to FIGS. 2 and 4, connector 52 comprises a first contact 62, a second contact 64, a first terminal 66, and a second terminal 68 necessary for electrical connection from the terminals (66, 68) to the contact points (38, 40). First contact 62 electrically connects with first terminal 66 and second contact 64 electrically connects with second terminal 68. First contact 62 has a first end 70 and a second end 72. Second contact 64, similar to first contact 62, also has a first end 74 and a second end 76. Second end 72 of first contact 62 is in contact with first contact point 38 on first leg 44 of film 36. Second end 72 of first contact 62 pierces first contact point 38 of first leg 44 in film 36 into webbing 22 to make an electrical connection through first leg 44. Second end 76 of second contact 64 is in contact with second contact point 40 on second leg 48 of film 36. Second end 76 of second contact 64 pierces second contact point 40 of second leg 48 in film 36 into webbing 22 to make an electrical connection through second leg 48. First end 70 of first contact 62 connects to a first terminal 66 in connector 52. First end 74 of second contact 64 connects to a second terminal 68 in connector 52.

FIGS. 4 and 6 specifically show the electrical connection through connector 52 between second contact point 40 and second terminal 68. Second terminal 68 connects with first end 74 of second contact 64 and second end 76 of the second contract 64 connecting with second contact point 40 on second leg 48 of film 36 on webbing surface 34 of webbing 22. The electrical connection (not shown) through connector 52 between first contact point 38 and first terminal 66 is similar to the electrical connection through connector 52 between second contact point 40 and second terminal 68 as shown in FIG. 4 and described herein.

Figure 7:
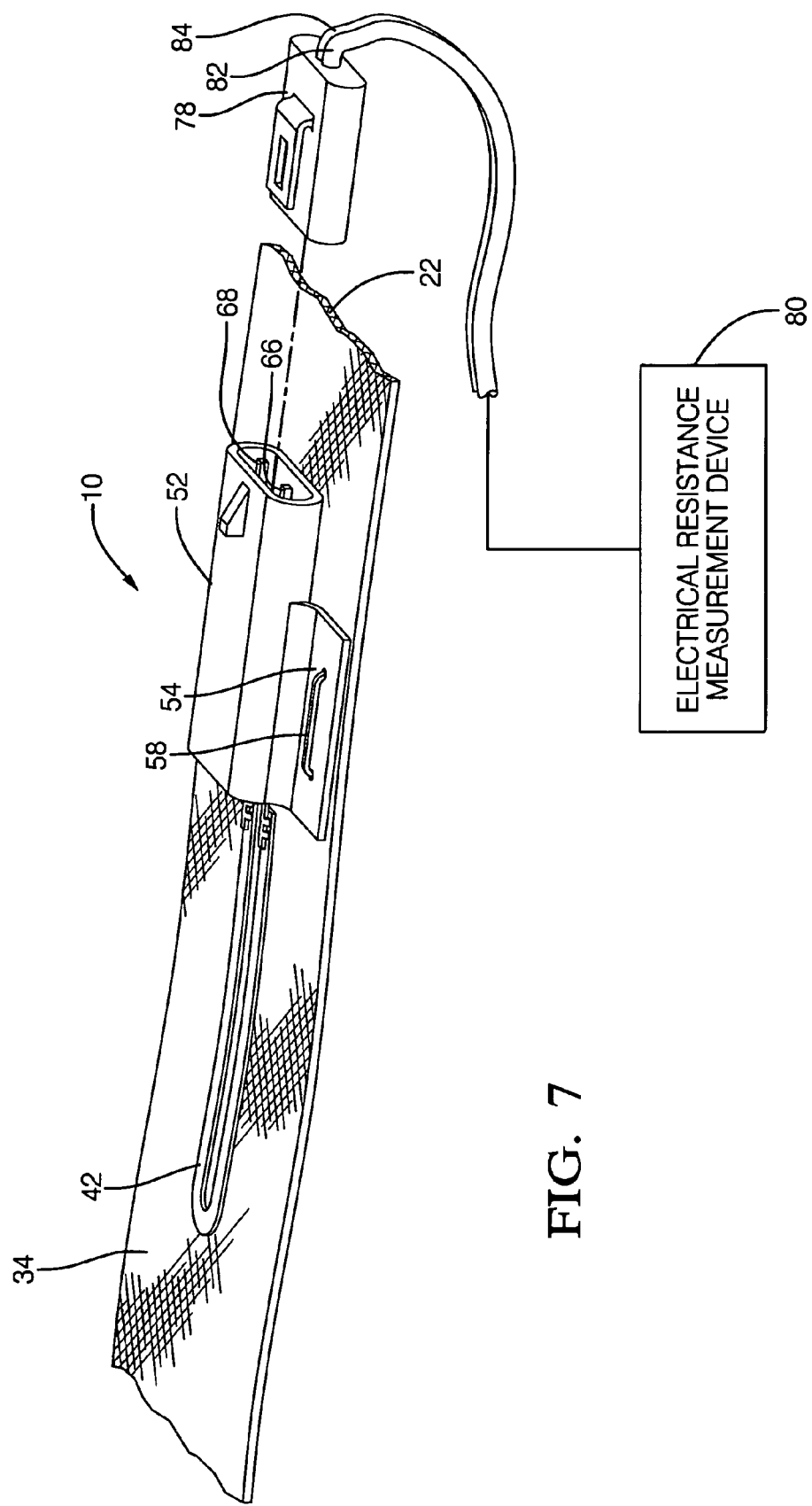
FIG. 7 is isometric view of the seat belt assembly in FIG. 2 connecting with a remote electrical resistance measurement device.

A mating connector 78 mates with connector 52 and electrically connects with first terminal 66 and second terminal 68 to provide resistance measurement capability of film 36 between first contact point 38 and second contact point 40. Mating connector 78, as shown in FIGS. 6-7, is wired to an electrical resistance measuring device 80 that is proximate to, or remote from, seat belt assembly 10 that measures electrical resistance of film 36 in seat belt assembly 10. First terminal 66 in connector 52 is electrically connected to a first input 82 on electrical resistance measuring device 80. Second terminal 68 is electrically connected to second input 84 on electrical resistance measuring device 80. The electrical resistance of film 36 measured between first contact point 38 and second contact point 40 is proportional to applied tension to webbing 22. The resistance data measured by electrical resistance measuring device 80 can be used by a vehicle occupant detection system to help protect vehicle occupants in the front passenger seat.

During operation with no occupant in seat 18, latch 24 of harness 12 is unbuckled from buckle 26 and webbing 22 is retracted into coiling mechanism 20 that collects the excess webbing 22 when harness 12 is not in use and no axial tension is applied to webbing 22. Film 36 of seat belt assembly 10 senses the absence of axial tension applied to webbing 22, hence surface 34, and exhibits a resistance proportional to the absence of axial tension applied to webbing 22. Electrical resistance measuring device 80 connected to the first contact point 38 and the second contact point 40 through terminals (66, 68) of connector 52 of seat assembly 16 measures a first resistance value of film 36 of seat belt assembly 10 in the absence of axial tension applied to webbing 22. The measured first resistance value can be collected and analyzed by a controller (not shown) that confirms the first resistance value of film 36 reflects that of a seat belt having webbing 22 absent of applied axial tension.

When occupant 28 sits in seat 18 and latches latch 24 of harness 12 into buckle 26, axial tension is applied to webbing 22, and hence surface 34. Applied axial tension on surface 34 is sensed by film 36 of seat belt assembly 10 and the resistance of film 36 between first contact point 38 and second contact point 40 changes from the resistance of film 36 in the absence of an axial tension applied to webbing 22. Electrical resistance measurement device 80 measures a second resistance value of film 36 between first contact point 38 and second contact point 40 that is indicative of axial tension applied to webbing 22. The measured second resistance value can be collected and analyzed by the controller (not shown) that confirms the second resistance value of film 36 is different from the first resistance value of seat belt assembly 10 with no applied axial tension to webbing 22 and reflects webbing 22 of seat belt harness 12 with applied axial tension.

It can be understood that the seat belt assembly is a variable signal reflected by an electrical resistance of the film that changes as the applied axial tension on the webbing of the seat belt harness changes where the electrical resistance of the film is proportional to tension applied axially to the webbing. For example, the tension applied to the harness is one value for an unbuckled harness in a storage condition, a second value for a harness that restrains a child seat in the seat, a third value for child occupant restrained in the seat, and a fourth value for an adult occupant restrained in the seat. Each condition has a different tension value applied to the film from the webbing surface that generates a unique resistance value on the film corresponding to the applied tension value.

It would be possible to incorporate multiple seat belt assemblies to improve the accuracy of determining tension on the webbing placed across an occupant in a vehicle seat. Identification of a hung-up seat belt anomaly, which can cause inaccurate tension readings, can easily be sensed and precisely compensated for with multiple seat belt assemblies applied on the webbing surface along the length of the webbing. Additional seat belt assemblies can also detect the amount of webbing dispensed from the coiling mechanism. The amount of dispensed webbing of a seat belt harness from the coiling mechanism can be calculated that provides additional data for error checking on the harness or diagnosing a faulty harness.

The invention provides a reliable way to determine tension on the webbing of a seat belt. The seat belt assembly eliminates the need to perform the restraint function of the seat belt harness further increasing occupant safety and instead only performs the axial tension determination function applied to the webbing. The seat belt assembly is physically located on the seat belt webbing simplifying the seat belt harness system. The seat belt assembly has few components that translate into a lower material cost. The simplicity of the seat belt assembly with the film being attached to the webbing is a robust design that may translate into a lower serviceability cost. The seat belt assembly components are low weight, and therefore, add little to the overall seat belt harness weight which is increasingly important to vehicle manufacturers to obtain higher vehicle fuel economy. The seat belt assembly can be easily integrated into webbing of seat belt with current manufacturing technology. If the seat belt assembly is manufactured on the webbing surface before the seat belt harness is installed into a vehicle at a vehicle assembly plant, the remaining vehicle assembly step may simply be to plug the mating connector into the seat belt harness connector.

While this invention has been described in terms of the preferred embodiment thereof, it is not intended to be so limited, but rather only to the extent set forth in the claims that follow.

We claim:

1. A seat belt assembly, comprising:
a webbing having a longitudinal axis, said webbing being formed of an electrically nonconductive material that elongates in response to axial tension;
a film having a shape and attached to the webbing so as to vary the shape in response to elongation of the webbing, said film being formed of an electrically resistive material and comprising a first contact point and a second contact point; and
a connector proximate to the webbing and including a first contact in contact with the first contact point and a second contact in contact with the second contact point for measuring an electrical resistance of said film therebetween, wherein the electrical resistance is proportional to tension applied axially to the webbing.

2. The seat belt assembly of claim 1, wherein the webbing has a webbing surface and said film is bonded to the webbing surface by silk-screen printing.

3. The seat belt assembly of claim 2, wherein the film is adhesively bonded to the webbing surface.

4. The seat belt assembly of claim 1, further comprising a carrier attached to the webbing, said film is attached to the carrier.

5. The seat belt assembly of claim 4, wherein the film is bonded to the carrier by silk-screen printing or adhesively bonded to the carrier.

6. The seat belt assembly of claim 5, wherein the carrier is sewn to the webbing.

7. The seat belt assembly of claim 1, wherein the connector comprises a first terminal and a second terminal, said first terminal being connected to the first contact and adapted to be electrically connected to a first input of an electrical resistance measuring device, and said second terminal being connected to the second contact and adapted to be electrically connected to a second input of the electrical resistance measuring device.

8. The seat belt assembly of claim 1, wherein said first contact pierces the film at the first contact point and said second contact pierces the film at the second contact point.

9. The seat belt assembly of claim 1, wherein the webbing has a first edge and a second edge parallel to the longitudinal axis, wherein the first edge and the second edge are spaced apart by the webbing surface.

10. The seat belt assembly of claim 1, wherein the film comprises a U-shaped strip having a first leg, a second leg spaced apart from the first leg, and a bridge section connecting the first leg and the second leg, said first leg comprising the first contact point spaced apart from the bridge section, said second leg comprising the second contact point spaced apart from the bridge section.

11. The seat belt assembly of claim 10, wherein the first leg extends axially and the second leg extends axially.

12. The seat belt assembly of claim 1, wherein the first contact and the second contact are spaced apart in a direction perpendicular to the longitudinal axis.

13. The seat belt assembly of claim 1, wherein the connector is attached to the webbing.

14. The seat belt assembly of claim 13, wherein the connector comprises one or more fasteners that attach the connector to the webbing.

15. The seat belt assembly of claim 14, wherein the film comprises a U-shaped strip having a first leg, a second leg spaced apart from the first leg, and a bridge section connecting the first leg and the second leg, and the connector includes a first fastener attaching the connector to the webbing outboard of a first leg and a second fastener attaching the connector to the webbing outboard of a second leg.

16. A method for determining tension on a webbing of a seat belt, said webbing comprising a longitudinal axis, said method comprising:

providing a film attached to said webbing, said film being formed of an electrically resistive material and comprising a first contact point and a second contact point;

connecting the first contact point and the second contact point to a resistance measuring device;

measuring a first electrical resistance value of the film in the absence of an axial tension applied to the webbing;

applying the axial tension to the webbing; and measuring a second electrical resistance value of the film, wherein the second electrical resistance value is indicative of the axial tension applied to the webbing.

17. A method for determining tension on a webbing of a seat belt of claim 16, wherein the webbing has a webbing surface and said film is bonded to the webbing surface by silk-screen printing or adhesively bonded to the webbing surface.

18. A method for determining tension on a webbing of a seat belt of claim 16, further comprising providing a carrier attached to the webbing, said film is attached to the carrier.

19. A method for determining tension on a webbing of a seat belt of claim 18, wherein the film is bonded to the carrier by silk-screen printing or adhesively bonded to the carrier, said carrier is sewn to the webbing.

20. A method for determining tension on the webbing of a seat belt of claim 17, wherein the film comprises a U-shaped strip having a first axial leg, a second axial leg, and a bridge section connecting the first axial leg and the second axial leg, said first axial leg including a first contact point spaced apart from the bridge section, said second axial leg comprises a second contact spaced apart from the bridge section, and the first contact point and the second contact point are perpendicular to the axis.

* * * * *